Patented Nov. 21, 1950

2,531,063

UNITED STATES PATENT OFFICE 2,531,063

CONDENSATION OF ACYL POLYMERS WITH AROMATIC HYDROCARBONS

Eugene Lieber, Chicago, Ill., and Aloysius F. Cashman, Staten Island, N. Y., assignors to Standard Oil Development Company, a corporation of Delaware No Drawing. Application November 29, 1947, Serial No. 788,964

10 Claims. (Cl. 260—590)

This invention relates to the preparation of novel chemical products and the uses thereof. More particularly, it relates to the preparation of novel pour depressors exhibiting unusual pour stability characteristics for waxy mineral lubricating oils.

Pour depressors for wax modifying agents which are usually prepared by the condensation of certain paraffinic material such as, for example chlorinated paraffine wax, with aromatic compounds such as naphthalene. While such products exhibit excellent pour depressing characteristics they are deficient in pour stability properties, i. e., while they are excellent pour depressants as measured by standard A. S. T. M. procedure, under certain conditions of winter storage the pour points rise to relatively high values such as to render ineffective the original purpose of the pour depressant. Stated in other terms the pour depressant characteristics may be said to be fugitive especially under certain low temperature conditions.

We have now discovered that pour depressants having pour stability properties superior to that of well-known pour depressants can be manufactured by the condensation of fatty acyl polymers with aromatic compounds.

In the discussion of reactions of fatty acids or their derivatives it is frequently necessary to refer to that group of atoms which remains when the hydroxyl group is removed from the fatty acid; such groups which are not capable of existence in the free state are known as the "acyl" groups or acid radicals. The term "fatty acyl polymer" hereinafter refers to a polymer of fatty acyl groups having at least 10 carbon atoms formed by catalytic condensation of fatty acid halides wherein a halogen hydride has been removed. Representative of such fatty acids from which the desired acyl group may be derived are; stearyl, palmitic, oleol and acids derived from coconut oil, linseed oil, cottonseed oil, soybean oil and the like. Aromatic substituted fatty acids such as phenyl stearyl, naphthyl stearyl, etc., may also be used effectively.

Among the aromatic compounds that may be used effectively in the practice of this invention are benzene, naphthalene, toluene, anthracene, phenanthrene, mixed coal tar derivatives, etc., and their hydroxy and amino derivatives such as benzol, naphthol, aniline, etc.

The present invention comprises condensing a fatty acyl polymer with an aromatic compound in the presence of a Friedel-Crafts catalyst and an inert solvent at a temperature of at least 150° F. for a period of about 2 hours. The pour depressing properties of the reaction material may be tested by blending in a waxy oil and determining the pour point of the resulting blends by the standard A. S. T. M. procedure.

The pour stability properties are tested by two procedures, namely,

1. Test "V" procedure.
2. Actual winter field exposure tests, which will be described hereinafter.

The Test "V" method for pour stability differs from the A. S. T. M. procedure in that the entire test is carried out in an enclosed cabinet which is subjected to a series of temperature cycles from —25° F. to higher levels to simulate the rise and fall of temperature during the winter. This test was designed to indicate the behavior of the oil during winter storage. Complete instructions of the use of said test are to be found in Oil and Gas Journal, vol. 42, No. 7, pp. 103–106, June 24, 1943.

The winter field tests on the product of the present invention were carried out at Minneapolis, Minnesota, and were carried out in sealed pint bottles. The general procedure for carrying out the tests consists in storing the samples in a rack exposed to outdoor temperatures, but protected from direct sunlight and snow. Sample fluidity observations are recorded each working day by tilting the sample and observing whether the oil moves or is solid. One examination is made per day at about 8:30 A. M.

The product of this invention may be incorporated in lubricating oil base stocks or in paraffin wax or in paraffinic gas oils, alone or in conjunction with oxidation inhibitors, extreme pressure agents, sludge dispersers, soaps, dyes, and materials such as graphite or zinc oxide, emulsifiers, resins or the like.

The following example illustrates some of the features of this invention:

200 grams of stearyl chloride having the formula

is treated with 10 grams of aluminum chloride at 600° F. for 2½ hours. After cooling and destroying the aluminum chloride, the product was recovered as a bottoms residue by distilling off volatile and unpolymerized materials to 600° F. under a vacuum of from 10–20 mm. mercury pressure. A yield of about 153 grams of a dark oil, a stearic acyl polymer, was obtained as product. This will be referred to below as "stearoyl polymer."

100 grams of "stearoyl polymer" and 10 grams of naphthalene were dissolved in 200 ccs. of tetrachlorethane as a solvent. To this mixture was added 20 grams of anhydrous aluminum chloride and the reaction carried out at 190° to 200° F. for two hours. At the end of this time the reaction mixture was cooled and diluted with a further quantity of solvent and the aluminum chloride destroyed with a dilute aqueous solution of hydrogen chloride. After settling, the aqueous layer was drawn off. The product was then recovered from the solvent layer by a fire and steam distillation to 600° F. A bottoms yield comprising 83 grams of a dark oil was obtained as product. The product was blended with a waxy-oil and the following A. S. T. M. results were obtained:

A. S. T. M. pour point, °F.
Original oil _____ +23
Original oil + 0.5% condensation product__ −10
Original oil + 1.0% condensation product__ −10

Pour stability was tested by the heretofore described Test "V" and field test. The results of these tests are summarized in the tables following:

TABLE I

*Comparative Test "V" pour stability property stearyl polymer-naphthalene condensation product*

| Additive | Per Cent in Test Oil [1] | ASTM Pour, °F. | Test "V" Solid Pt., °F. | |
|---|---|---|---|---|
| | | | Cycle 2 | Cycle 3 |
| Commercial Paraflow (Chlorwax-Aromatic condensation product) | 1.25 | −30 | +16 | +8 |
| | 1.50 | −30 | +12 | −2 |
| Stearyl-Polymer-Naphthalene Product | 0.50 | −15 | [2] DNGS | −18 |
| | 0.75 | −20 | DNGS | DNGS |

[1] Test oil is Baton Rouge 442 Neutral plus 3.5% Penn. Bright Stock.
[2] Means that blend "did not go solid" at period of observation.

TABLE II

*Comparative winter field storage behavior of stearyl - polymer - naphthalene condensation product*

| Additive | Per Cent in Test Oil [1] | A. S. T. M. Pour, °F. | Minneapolis [2] Field Test Station | | | |
|---|---|---|---|---|---|---|
| | | | Number of Observations | Times Observed to be Solid | Highest Solid Point | Frequency of Solidification [3] |
| | | | | | °F. | Per cent |
| Commercial Paraflow (Chlorwax—Aromatic Condensation Product) | 1.0 | −25 | 46 | 12 | +20 | 26.0 |
| Commercial Santopour B (Paraffin Wax—Phenol Condensation Product) | 1.0 | −15 | 46 | 7 | +20 | 15.2 |
| Present Invention | 1.0 | −20 | 35 | 1 | +20 | 2.9 |

[1] Baton Rouge 442 Neutral plus 3.5% Pennsylvania Bright Stock.
[2] The lowest observed temperature at this station during period of test was −5° F.
[3] Ratio of times solid to number of observations.

It will be noted at once that the product of the present invention has superior pour stability properties as compared to commercial products. It should be kept in mind in interpreting the data that Test "V" does not indicate the actual solid points that might be found in the field but that it indicates a statistical behavior of one oil over another, i. e., whether one oil will "on the average" behave better than another throughout winter storage conditions.

It will be noted that the product of the present invention shows marked superiority in pour stability properties over commercial additives to which it has been compared, the "frequency of solidification" being of the greatest significance in this respect.

The above description is intended to be illustrative only. Any modification or variation thereof which conforms to the spirit of the invention is intended to be included.

We claim:

1. A process for preparing a condensation product of an acyl polymer and a monomeric aromatic hydrocarbon which comprises auto-condensing a fatty acid chloride of at least 10 carbon atoms in the presence of aluminum chloride at a temperature of about 600° F. for a period of time of about 2½ hours and condensing the fatty acyl polymer thus formed with said monomeric aromatic hydrocarbon in the presence of a Friedel-Crafts catalyst and an inert solvent at a temperature of at least 150° F. for a period of about 2 hours.

2. A process according to claim 1 wherein the temperature at which the acyl polymer is condensed with the monomeric aromatic hydrocarbon is from 190° F. to 200° F.

3. A process according to claim 1 wherein the fatty acid chloride is stearyl chloride.

4. A process according to claim 1 wherein the monomeric aromatic hydrocarbon is benzene.

5. A process according to claim 1 wherein the monomeric aromatic hydrocarbon is naphthalene.

6. A composition consisting essentially of the condensation product of an acyl polymer and a monomeric aromatic hydrocarbon, said acyl polymer being formed by condensing a fatty acid chloride of at least 10 carbon atoms in the presence of aluminum chloride at a temperature of about 600° F. for a period of time of about 2½ hours, said polymer after its polymerization being condensed with said monomeric aromatic hydrocarbon in the presence of a Friedel-Crafts catalyst and an inert solvent at a temperature of at least 150° F. for a period of about 2 hours.

7. The product according to claim 6 in which the condensation temperature of the acyl polymer and the monomeric aromatic hydrocarbon is within a range of 190 to 200° F.

8. A product according to claim 6 wherein the acyl polymer is a stearyl acyl polymer.

9. A product according to claim 6 wherein the monomeric aromatic hydrocarbon is benzene.

10. A product according to claim 6 wherein the monomeric aromatic hydrocarbon is naphthalene.

EUGENE LIEBER.
ALOYSIUS F. CASHMAN.

REFERENCES CITED

The following references are of record in the file of this patent:

UNITED STATES PATENTS

| Number | Name | Date |
|---|---|---|
| 2,214,117 | Boese | Sept. 10, 1940 |
| 2,251,550 | Lieber | Aug. 5, 1941 |
| 2,308,184 | Lieber | Jan. 12, 1943 |
| 2,315,063 | Lieber | Mar. 30, 1943 |
| 2,337,922 | Pier et al. | Dec. 28, 1943 |